Sept. 29, 1925.

F. B. BELL 1,555,546

WHEEL CLAMPING DEVICE

Filed Oct. 9, 1922

Inventor
Frank B. Bell
By Munday, Clarke & Carpenter Attys.

Sept. 29, 1925.
F. B. BELL
1,555,546
WHEEL CLAMPING DEVICE
Filed Oct. 9, 1922   2 Sheets-Sheet 2
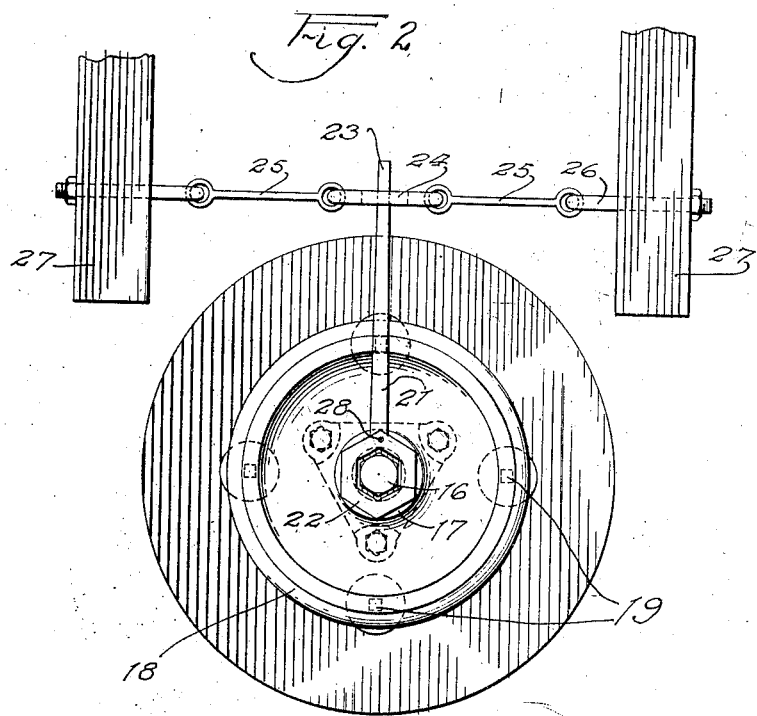

Patented Sept. 29, 1925.

1,555,546

UNITED STATES PATENT OFFICE.

FRANK B. BELL, OF PITTSBURGH, PENNSYLVANIA, ASSIGNOR TO EDGEWATER STEEL COMPANY, OF PITTSBURGH, PENNSYLVANIA, A CORPORATION OF PENNSYLVANIA.

WHEEL-CLAMPING DEVICE.

Application filed October 9, 1922. Serial No. 593,181.

*To all whom it may concern:*

Be it known that I, FRANK B. BELL, a citizen of the United States, residing in Pittsburgh, in the county of Allegheny and State of Pennsylvania, have invented a new and useful Improvement in Wheel-Clamping Devices, of which the following is a specification.

This invention relates in general to means for clamping and releasing heavy metal articles from a rotating boring machine or other apparatus in which they may be rotatively mounted for machining and other operations. While the embodiment of the invention hereinafter disclosed is more particularly adapted for machining of the periphery or tread of a car wheel, it will be readily manifest that the invention has other and wider application. In clamping an article, such as a car wheel, upon a rotating table of a boring mill or other piece of apparatus it has been generally the custom in the past to place the wheel in position and secure it by a bolt arranged at the axial center of the table and screwed into a threaded opening therein. The whole apparatus is large and the work must be clamped tightly in place. This has required the use of a wrench for tightening the bolt, which weighs from 75 to 80 pounds and which as a result requires the expenditure of a large amount of energy in lifting it from the floor and engaging it with the bolt head.

In practice after the wrench has been positioned the mill is started, the wrench catching against the frame and by restraining the bolt causing movement of the table to screw the bolt home. Thereafter the wrench is removed and placed upon the floor, being lifted now from the bolt. The same operation must be pursued in removing the wheel so that this 75 or 80 pounds weight must be lifted by the attendant four times for each wheel machined.

It is a principal object of my present invention to incorporate in the mill or other piece of apparatus means for tightening the bolt, or other clamping device, so that these lifting operations may be eliminated.

A further object of the invention is the accomplishment of the above stated purpose and without altering essentially the character of the apparatus or greatly increasing the investment cost.

Other objects and advantages of the invention will be apparent as it is better understood from the following description, which, taken in connection with the accompanying drawings, discloses a preferred embodiment thereof.

Fig. 2 is a partial top plan view of the bolt tightening device.

Figure 1:
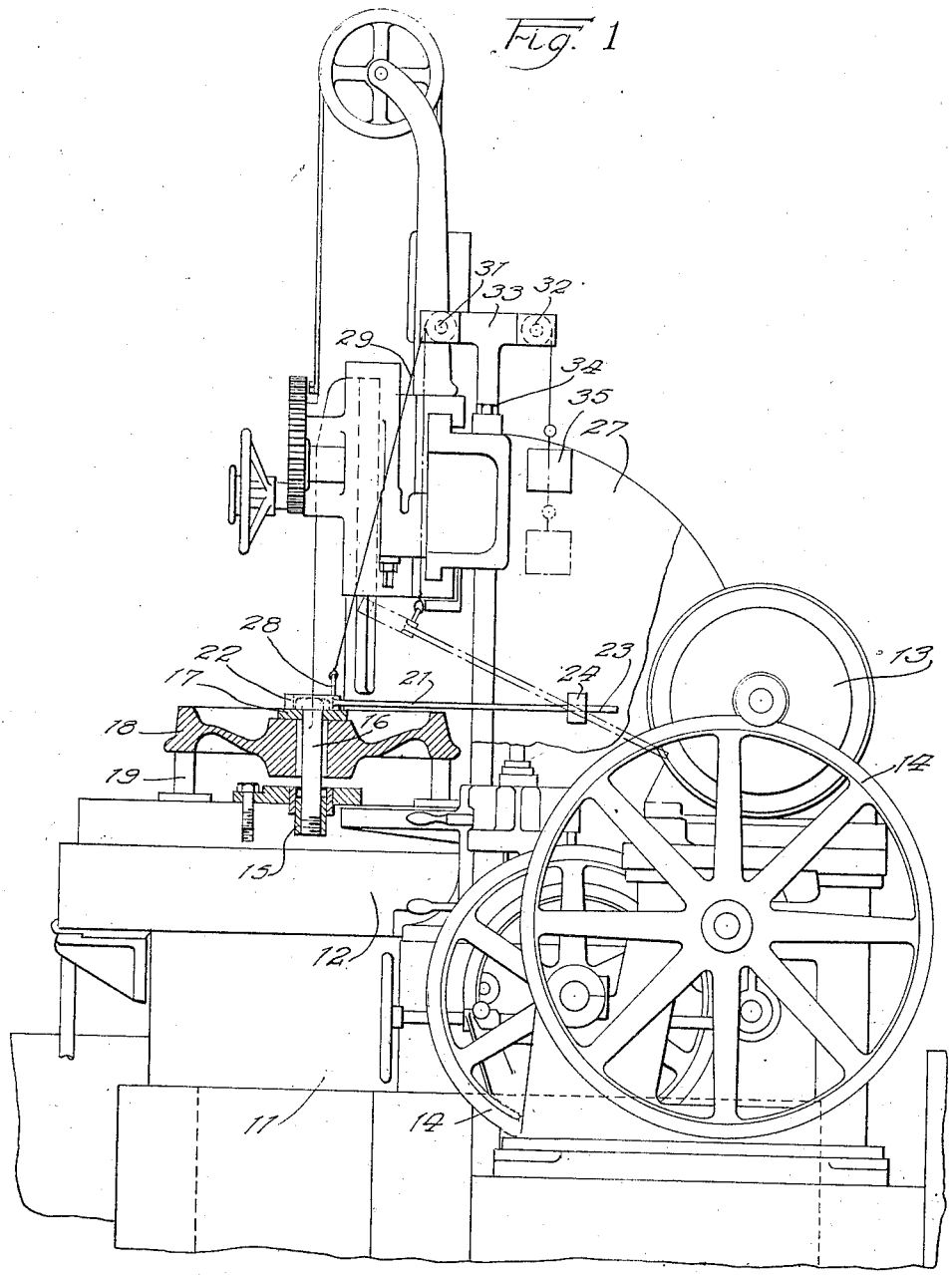
Figure 1 is a schematic showing of a boring mill of the character employed in machining car wheels, the bolt handling member or wrench being shown in elevation.

Referring to the drawings, reference character 11 designates the frame of the mill and reference character 12 the usual rotating table. A motor 13, through suitable gearing 14, causes this table to rotate in the usual manner. The table is provided in its axial center with a threaded aperture 15, in which may be positioned the clamping bolt 16, it being noted at this point that a fixed stud and clamping nut, or other equivalent device, could be used within the purview of the invention, instead of the bolt 16, if desired. This bolt engages a washer 17 pressing the car wheel down upon the usual blocks 19. In the present instance, I have provided a wrench 21 for tightening and loosening the bolt. This wrench is of the ordinary or usual character, being provided at one end with a bolt engaging head 22 and at the other, with the handle 23. This handle extends through a link 24 connected by links 25 with eye members 26 secured in frame parts 27.

I secure an eye member 28 in the wrench head and to this I attach a cable 29 taking over shafts 31 and 32 in a shaft carrier 33 mounted at 34 on the frame. The cable 29 is provided with a counter-balancing weight 35. The wrench is adapted to be lifted manually up from and be lowered down from the bolt head, its shank or handle 23 sliding in the link 24 in this movement. After it has been positioned the mill is started in the usual fashion and the rotation of the table caused to draw the bolt home or to free it.

Viewing Figure 2 it will be noted that the wrench shank or handle has appreciable play in the link 24. This permits loosening of the wrench after acting upon the bolt. If necessary the table may be turned slightly backward to free the wrench from too great pressure against the link end. It will be apparent that the invention is capable of various embodiments and that it is easily possible in various manifest ways to incorporate it in the design of a mill, the wrench construction shown being selected as the simplest possible form of the invention. This particular embodiment possesses the additional value in that it permits of incorporation in the presses in service and without substantial or any interruption of their operation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an apparatus for machining car wheels and the like, the combination of a frame, a rotatable table carried therein and having a threaded aperture at its axial center, a screw member adapted to be engaged in said aperture to hold the work to the table, a wrench member pivoted in the frame and adapted to be lowered into and raised from engagement with the head of said screw member to restrain it against rotation with the table to tighten and loosen it.

2. In an apparatus for machining car wheels and the like, the combination of a frame, a rotatable table carried therein and having a threaded aperture at its axial center, a screw member adapted to be engaged in said aperture to hold the work to the table, a wrench member pivoted in the frame and adapted to be lowered into and raised from engagement with the head of said screw member to restrain it against rotation with the table to tighten and loosen it, and means counter-balancing the weight of said member.

FRANK B. BELL.